Jan. 19, 1960 A. L. ANDREW 2,922,020
METHOD AND APPARATUS FOR FORMING LAP WELDED TUBING
Filed Dec. 12, 1958
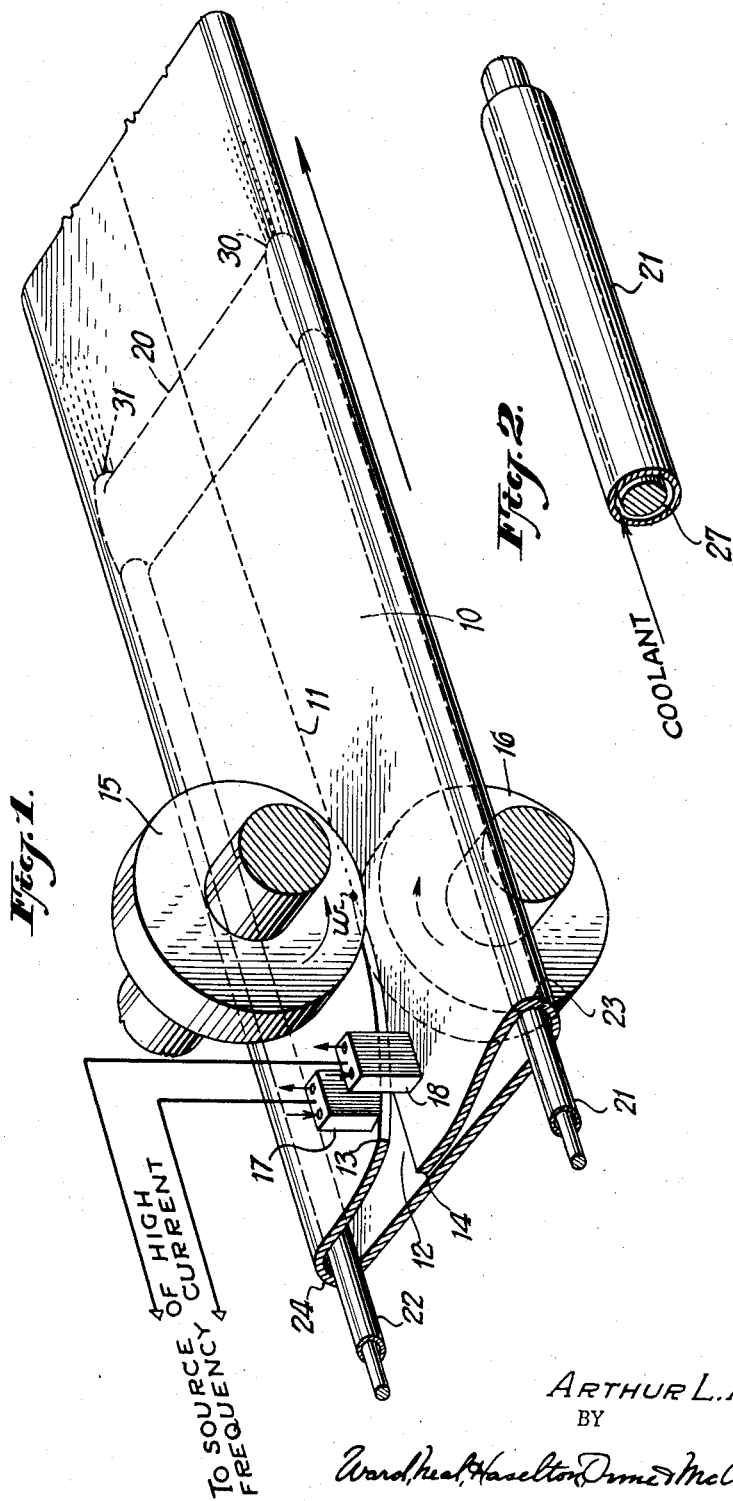
INVENTOR.
ARTHUR L. ANDREW.
BY
Ward, Neal, Haselton, Orme & McElhannon
ATTORNEYS.

United States Patent Office 2,922,020
Patented Jan. 19, 1960

2,922,020

METHOD AND APPARATUS FOR FORMING LAP WELDED TUBING

Arthur L. Andrew, Cleveland, Ohio, assignor to Magnetic Heating Corp., New Rochelle, N.Y., a corporation of New York Application December 12, 1958, Serial No. 779,991

7 Claims. (Cl. 219—67)

This invention relates to methods and apparatus for welding tubing and the like by the use of high frequency resistance heating, the invention being particularly adapted, among other uses, for the welding of relatively small and thin welded tubing and which may normally have a somewhat flattened or oval cross-section or which, if desired, in its finished condition, may be of circular or other cross-sections.

Reference is made to U.S. patents of Wallace C. Rudd and Robert J. Stanton No. 2,818,488, granted December 31, 1957, and No. 2,833,910, granted May 6, 1958. Said patents disclose methods and means for welding together the edges defining a longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent the gap edges at points positioned shortly in advance of the welding point, the current being of a frequency sufficiently high so that the lowest impedance path between the electrodes follows said gap edges to and from the weld point and heats such edges to welding temperature.

The present invention involves alternatives for and improvements upon the features of such method and apparatus.

When the tubing to be welded is of relatively small diameter, and particularly if same is formed of relatively thin material, it is a very difficult problem to use the methods and apparatus of the above-mentioned patents, because it is difficult so to control the positions of the thin edges on the opposite sides of the longitudinal gap as the tubing is advanced, in such manner that such edges will come together uniformly and accurately at the weld point and it is difficult to provide any means internally of the tubing such as will control the undersurfaces of such edges approaching the weld point. With the present invention, these difficulties, however, are avoided by forming a metal strip substantially in advance of the weld point into a tube of relatively oval or somewhat flattened cross-sectional shape and with the longitudinal edges of the metal which are to be welded together positioned in spaced somewhat overlapped relation and so that as the tubing as thus formed is advanced to the weld point, such overlapping edges will approach each other with a V-shaped gap therebetween, the apex of which is located substantially at the weld point. And, at the region of such weld point, pressure rollers or other pressure applying means are applied to the undersurface of the flattened tubing (opposite from the overlapping edges) and also to the upper surfaces at the region of the weld point, whereby the overlapped edges which are heated by high frequency current in advance of the weld point, are pressed together and pressed down against the opposite wall of the tubing. In this way, the overlapped edges may be brought into good forged welded relation at the region of the weld point by reason of pressure applied to the upper side of the welded seam area reacting against pressure applied against the underside or back surface of the tubing opposite from the welded seam.

Further in accordance with the invention, means, if desired, may be provided for extending into the tubing beyond the weld point in the form of a suitably shaped internal mandrel portion for reshaping the flattened tubing to a more expanded shape, if desired, or to a shape of circular or other cross-sectional form.

The resulting tubing is well adapted for use for example in various types of radiators, particularly in cases where it is desired to have the tubing of a somewhat flattened or oval cross-sectional shape and formed of copper, aluminum or alloys thereof, or of other metals including steel, if desired.

Various further and more specific objects, features and advantages of the invention will appear from the description given below, taken in connection with the accompanying drawings, illustrating by way of example a preferred form of the invention.

In the drawings:

Fig. 1 is a somewhat schematic view of a presently preferred arrangement of apparatus for carrying out the invention; and Fig. 2 is an enlarged perspective view of a portion of the apparatus of Fig. 1.

In the drawings, the apparatus is shown in such position as to form the longitudinal welded seam on the tubing along on the metal of the upper portion thereof, but it will be understood that the apparatus may be mounted or turned to other positions with respect to the horizontal, or even inverted, and that therefore, the expressions "upper" and "lower" as used herein for convenience in describing the apparatus in the position shown in the drawings, are merely relative.

As shown in the drawings, a continuous length of tubing 10 of somewhat flattened or generally oval shape, is shown as being advanced longitudinally through the apparatus in the direction of the arrow shown and past the region of a weld point $w$ at which the lap welded seam 11 is formed.

Such tubing may, of course, be formed from a continuous strip, which, by suitable known means such as dies, rollers or other shaping means (not shown) is formed into the generally flattened or oval shape before it reaches the apparatus shown in Fig. 1. As thus shaped, the tubing approaches the apparatus shown in a form such that it will have a gap 12 along adjacent the line of the desired seam and with the edges 13 and 14 on opposite sides of such gap in somewhat overlapped relation. Such gap will form a V-shape for a distance shortly in advance of the region of the weld point, with the overlapped edges coming together at or adjacent the weld point. To bring the overlapped edges thus forcibly under pressure together, means such as a pressure roller 15 may be applied to the upper surface at the region of the weld point to apply pressure reacting downwardly against an under pressure roller 16, which engages the underside of the tube, that is, the outside surface of the wall of the tube opposite from the line of the desired welded seam, and so that the "back side" (viz. under side) wall of the tubing is pressed firmly up against the underlying one of the overlapping edges, viz. edge 14. That is, at the region of the weld point, there will be three thicknesses of metal firmly pressed together, viz.: first, the back wall of the tubing; second, the underlying edge portion 14; and third, the overlying edge portion 13.

However, in view of the manner in which the portions to be welded are heated as hereinafter described, only the opposed surfaces in the gap 12 will become welded together despite the application of pressure to the three thicknesses of metal, as aforesaid, and the undersurface of the edge portion 14 will remain free of being welded to the opposite or under wall surface of the tubing. In order properly to heat the surfaces to be welded, to achieve this result, contacts as at 17 and 18 are applied at the positions shown by the arrows 17 and 18, at or adjacent respectively the edges 13 and 14, these contacts being connected respectively to the terminals of a source of high frequency current, whereby a heating current path is provided from the contacts respectively to and from the weld point, this heating current, by reason of the high frequency, being largely concentrated upon the surface bands which oppose each other in the V-shaped gap. That is, a band on the upper surface of the edge portion 14 will be heated, and a band on the undersurface of the edge portion 13 will be heated, and, because of the proximity effect with such high frequency current, even though the contacts 17 and 18 are not applied exactly at such bands, the current nevertheless will be confined largely to such bands, viz. bands of the width of the overlap. The very surface portions of such bands will thus be heated to a very shallow depth in the metal, thus leaving the remainder of the portions of the edges 13 and 14 quite firm, so that the pressure rollers will press the bands into good forged welded relationship, without danger of marring or disrupting the top surface of the tubing, or the bottom, or under, surface thereof, and without danger of welding the bottom wall of the tube to the lapped portions.

As disclosed in the above-mentioned patents, the contacts 17, 18 should be fluid-cooled and the high frequency current used preferably is of a frequency of the order of 100,000 cycles per second or higher, for example 400,000 to 500,000 cycles.

In the event that the tube metal is, for example, quite thin, so that the undersurface of the edge 14 might become sufficiently heated to tend to adhere to the upper surface of the lower wall, then one or both of these surfaces may, at some point in advance of the apparatus shown, be coated with suitable material to prevent same from adhering or sticking together when heated. For example, for this purpose, the surfaces might be covered with a finely-divided or powdered soap material of any of the well known types such as are smeared when wet on window surfaces, then allowed to dry and then be rubbed off to clean the window.

If it is desired that the tubing, after it leaves the welding region, remain relatively flat, the natural springiness of the metal will normally be such that the region of the welded lapped seam will spring upwardly somewhat, leaving within the tubing a cavity of generally flat-shaped or oval cross-section; or if the tube metal is not springy, there may remain a tube cavity which is more or less divided into two longitudinally extending portions by the depressed region of the lapped seam. On the other hand, if it is desired to finally expand the tubing into a more oval or a circular or other cross-sectional shape, then suitable correspondingly shaped mandrel means, as indicated by dotted lines at 20, may be mounted so as to be retained within the tubing at a position subsequent to the weld point, the shape of this member being such as to cause the inside flattened walls to be spread apart to the extent and shape desired. The mandrel means 20 may be carried as by rods 21 and 22, which extend back to any suitable supporting means therefor (not shown) the supporting means being suitably mounted to extend into the tubing through the gap therein at a point where such gap is still quite wide. If desired, the rods 21 and 22 may be of such diameters as substantially to fill the looplike edge portions at 23, 24 of the tubing, thus preventing same from being unduly collapsed or creased.

With the apparatus as thus far described, the high frequency current flowing between the contacts 17 and 18 may have three paths: first, a useful path along the above-mentioned bands which are to be heated and which extend to and from the weld point; secondly, a path from contact 17 around the loop 24 and back to contact 18; and thirdly, a path from contact 18 around the loop 23 and back around loop 24 to the contact 17. The current which would thus flow generally circumferentially of the tubing around the loops 23 and 24, would be largely wasted, but in some cases, this may be a relatively unimportant factor, since, if the tube metal is quite thin, the amount of power for providing the heating current will be relatively small.

However, if it is desired to minimize the current flowing along paths generally circumferentially of the tubing, then the rods 21, 22 may be made hollow, as indicated in Fig. 2, with rods or masses of material therein as at 27 formed of suitable magnetic core material which will have the effect of greatly increasing the impedance for said high frequencies of the current paths around the loop portions 23 and 24 of the tubing. For example, as disclosed in the above-mentioned patents, the magnetic core means may comprise, for example, rods of sintered magnetic oxide insulation material of known types which have a low loss factor, high volume resistivity, and a permeability preferably substantially greater than unity, for example, such as the material marketed under the trade name "Ferramic" by General Ceramics & Steatite Corp. This material is a non-electrical conductor and has a Curie point in the range of about 200° to 300° F.

Since the rods 27 and the tubes 21, 22, will, because of the high frequency fields present, tend to become overheated, these tubes may be formed with sufficient clearance space about the rods 27, whereby suitable streams of cooling fluid, such as water, may be directed thereinto, as shown in Fig. 2, to pass therethrough and to escape therefrom, at the region of the mandrel 20, through apertures located as at points 30 and 31.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding a longitudinally extending lapped seam in tubing, which comprises: advancing the tubing with the edges which are to be lap welded together, in somewhat overlapping relation and with a V-shaped gap therebetween having its apex at the desired weld point; applying pressure at the region of the desired weld point to the upper surface of the overlying edge portion, such pressure reacting against supporting means engaging the undersurface of the opposite wall portion of the tubing, the pressure being sufficient to cause the overlapped edge portions to be pressed together and pressed down against the opposite wall portion of the tubing at the region of the weld point; and heating bands which extend along on the opposed surfaces of the edge portions within said gap in advance of the weld point by applying contacts to said portions respectively in advance of the weld point and connected to the terminals of a source of high frequency current, whereby such current flows from said contacts along on said bands to and from the weld point for heating such bands to welding temperature by the time same reach the weld point.

2. Method for welding a longitudinally extending lapped seam in tubing, which comprises: advancing the tubing with the edges which are to be lap welded together, in somewhat overlapping relation and with a V-shaped gap therebetween having its apex at the desired weld point; applying pressure at the region of the desired weld point to the upper surface of the overlying edge portion, such pressure reacting against supporting means engaging the undersurface of the opposite wall portion of the tubing, the pressure being sufficient to cause the overlapped edge portions to be pressed together and pressed down against the opposite wall portion of the tubing at the region of the weld point; heating bands which extend along on the opposed surfaces of the edge portions within said gap in advance of the weld point by applying contacts to said portions respectively in advance of the weld point and connected to the terminals of a source of high frequency current, whereby such current flows from said contacts along on said bands to and from the weld point for heating such bands to welding temperature by the time same reach the weld point; and maintaining mandrel-like means within the tubing at a position beyond the weld point and shaped to separate the opposed wall portions of the tubing to form the tubing with an internal cavity of predetermined cross-section.

3. Method for welding a longitudinally extending lapped seam in tubing of somewhat flattened cross-section, which comprises: advancing the tubing with the edges which are to be lap welded together, in somewhat overlapping relation and so that same come together adjacent a desired weld point; applying pressure at the region of the desired weld point to the upper surface of the overlying edge portion, such pressure reacting against supporting means engaging the undersurface of the opposite wall portion of the tubing, the pressure being sufficient to cause the overlapped edge portions to be pressed together and pressed down against the opposite wall portion of the tubing at the region of the weld point; and heating opposed bands which extend along on the opposed surfaces of the edge portions which are to be pressed together at the weld point by applying contacts to said portions respectively in advance of the weld point and connected to the terminals of a source of high frequency current, whereby such current flows from said contacts along on said bands to and from the weld point for heating such bands to welding temperature by the time same reach the weld point, but without heating to welding temperature the surface of said opposite wall portion against which the overlapping portions are pressed.

4. Method for welding a longitudinally extending lapped seam in tubing of somewhat flattened cross-section, which comprises: advancing the tubing with the edges which are to be lap welded together, in somewhat overlapping relation and so that same come together adjacent a desired weld point; applying pressure at the region of the desired weld point to the upper surface of the overlying edge portion, such pressure reacting against supporting means engaging the undersurface of the opposite wall portion of the tubing, the pressure being sufficient to cause the overlapped edge portions to be pressed together and pressed down against the opposite wall portion of the tubing at the region of the weld point; heating opposed bands which extend along on the opposed surfaces of the edge portions which are to be pressed together at the weld point by applying contacts to said portions respectively in advance of the weld point and connected to the terminals of a source of high frequency current, whereby such current flows from said contacts along on said bands to and from the weld point for heating such bands to welding temperature by the time same reach the weld point, but without heating to welding temperature the surface of said opposite wall portion against which the overlapping portions are pressed; and maintaining magnetic core means within the cavity portions in the tubing adjacent its respective edge portions for increasing the impedance to the high frequency currents which tend to flow from the contacts around such edge portions.

5. Apparatus for welding a longitudinal lapped seam in tubing of somewhat flattened cross-section, comprising in combination: means for advancing the tubing and with the edges which are to be lap welded together in somewhat overlapping relation and so that same come together adjacent a desired weld point; a pressure roller for applying pressure at the region of the desired weld point to the upper surface of the overlying edge portion; another pressure roller for engaging the undersurface of the opposite wall portion of the tubing, said rollers being so relatively positioned and being adapted to apply sufficient pressure therebetween to press the overlapped edge portions together and down against the opposite wall portion of the tubing at the region of the weld point; and means for heating in advance of the weld point opposed bands on the surfaces which overlap to form the lapped seam, without heating to welding temperature the surface of said opposite wall portion against which the overlapping portions are pressed, said heating means comprising contacts engaging respectively the approaching overlapped edges in advance of the weld point, said contacts being connected respectively to the terminals of a source of high frequency current, whereby such current flows from said contacts along on said bands to and from the weld point.

6. Apparatus for welding a longitudinal lapped seam in tubing of somewhat flattened cross-section, comprising in combination: means for advancing the tubing and with the edges which are to be lap welded together in somewhat overlapping relation and so that the same come together adjacent a desired weld point; a pressure roller for applying pressure at the region of the desired weld point to the upper surface of the overlying edge portion; another pressure roller for engaging the undersurface of the opposite wall portion of the tubing, said rollers being so relatively positioned and being adapted to apply sufficient pressure therebetween to press the overlapped edge portions together and down against the opposite wall portion of the tubing at the region of the weld point; means for heating in advance of the weld point opposed bands on the surfaces which overlap to form the lapped seam without heating to welding temperature the surface of said opposite wall portion against which the overlapping portions are pressed, said heating means comprising contacts engaging respectively the approaching overlapped edges in advance of the weld point, said contacts being connected respectively to the terminals of a source of high frequency current, whereby such current flows from said contacts along on said bands to and from the weld point; and mandrel-like means and means for supporting same at a position in the tubing beyond the weld point, such mandrel-like means being shaped to separate the opposed wall portions of the advancing tubing to form the tubing with a cavity of predetermined cross-section.

7. Apparatus for welding a longitudinal lapped seam in tubing of somewhat flattened cross-section, comprising in combination: means for advancing the tubing and with the edges which are to be lap welded together in somewhat overlapping relation and so that same come together adjacent a desired weld point; a pressure roller for applying pressure at the region of the desired weld point to the upper surface of the overlying edge portion; another pressure roller for engaging the undersurface of the opposite wall portion of the tubing, said rollers being so relatively positioned and being adapted to apply sufficient pressure therebetween to press the overlapped edge portions together and down against the opposite wall portion of the tubing at the region of the weld point; means for heating in advance of the weld point opposed bands on the surfaces which overlap to form the lapped seam without heating to welding temperature the surface of said opposite wall portion against which the overlapping portions are pressed, said heating means comprising contacts engaging respectively the approaching overlapped edges in advance of the weld point, said contacts being connected respectively to the terminals of a source of high frequency current, whereby such current flows from said contacts along on said bands to and from the weld point; and magnetic core means and means for supporting same within the cavity portions within the tubing adjacent its respective edge portions for increasing the impedance to the high frequency currents which tend to flow from the contacts around said edge portions.

References Cited in the file of this patent

UNITED STATES PATENTS

| | | |
|---|---|---|
| 1,935,152 | Holmes | Nov. 14, 1933 |
| 2,629,806 | Anderson | Feb. 24, 1953 |
| 2,886,691 | Rudd | May 12, 1959 |